United States Patent
Heineck et al.

(10) Patent No.: US 9,746,344 B2
(45) Date of Patent: Aug. 29, 2017

(54) SENSOR SYSTEM AND METHOD FOR DETERMINING A SWITCHING POINT FOR A SENSOR SYSTEM IN AN AUTOMATED MANNER

(71) Applicant: FESTO AG & Co. KG, Esslingen (DE)

(72) Inventors: Torsten Heineck, Denkendorf (DE); Wolfgang Rieder, Esslingen (DE)

(73) Assignee: FESTO AG & CO. KG, Esslingen (DE)

( * ) Notice: Subject to any disclaimer, the term of this patent is extended or adjusted under 35 U.S.C. 154(b) by 0 days.

(21) Appl. No.: 14/902,478

(22) PCT Filed: Jul. 5, 2014

(86) PCT No.: PCT/EP2014/001851
§ 371 (c)(1),
(2) Date: Dec. 31, 2015

(87) PCT Pub. No.: WO2015/003791
PCT Pub. Date: Jan. 15, 2015

(65) Prior Publication Data
US 2016/0377452 A1    Dec. 29, 2016

(30) Foreign Application Priority Data
Jul. 12, 2013 (DE) .................. 10 2013 011 668

(51) Int. Cl.
*G01B 7/14* (2006.01)
*G01D 5/12* (2006.01)
(Continued)

(52) U.S. Cl.
CPC ............. *G01D 5/12* (2013.01); *G01D 18/004* (2013.01); *G01D 5/145* (2013.01)

(58) Field of Classification Search
CPC ........... B60L 13/06; G01B 7/02; G01B 7/003; G01B 7/023; G01B 7/14; G01D 5/145;
(Continued)

(56) References Cited

U.S. PATENT DOCUMENTS 4,709,209 A * 11/1987 Murakami ............. G01B 7/004
178/18.07
4,931,940 A * 6/1990 Ogawa .................. F02D 41/009
701/101
(Continued)

FOREIGN PATENT DOCUMENTS

DE 10013196 9/2001
DE 102007029488 1/2009
(Continued)

*Primary Examiner* — Thang Le
(74) *Attorney, Agent, or Firm* — Hoffmann & Baron, LLP (57) ABSTRACT

A sensor system for detecting a position of a measuring object relative to a sensor, the system including a sensor for the provision of a measured value and an evaluation device for the evaluation of the measured value and for the provision of an evaluation result, wherein the evaluation device includes a comparison device and a timing element, the comparison device is configured for a comparison of a stored measured value with a currently detected measured value, the comparison device is configured for a provision of a control signal to the timing element if a result of the comparison meets a presettable criterion, the timing element is configured in such a way that a time measurement process is continued at the provision of the control signal and the time measurement process is started anew at an absence of the control signal, the timing element is configured in such a way that a trigger signal is output by the timing element on reaching a presettable period of time.

11 Claims, 4 Drawing Sheets

(51) Int. Cl.
*G01D 18/00* (2006.01)
*G01D 5/14* (2006.01)

(58) Field of Classification Search
CPC .... G01D 5/485; G01D 5/2457; G01D 5/2451; G01D 11/245; G01P 3/443; G01P 3/487
USPC ...................................... 324/207.11–207.26
See application file for complete search history.

(56) References Cited

U.S. PATENT DOCUMENTS

| | | | | |
|---|---|---|---|---|
| 5,767,669 | A * | 6/1998 | Hansen | G01B 7/004 324/207.12 |
| 8,013,596 | B2 * | 9/2011 | Hoshino | G01D 5/145 324/207.2 |
| 2005/0225321 | A1 * | 10/2005 | Kurumado | G01D 5/147 324/207.21 |
| 2015/0192152 | A1 * | 7/2015 | Kageyama | G01D 5/145 324/207.12 |

FOREIGN PATENT DOCUMENTS

| | | |
|---|---|---|
| DE | 102012221005 | 5/2013 |
| WO | WO9942789 | 8/1999 |

\* cited by examiner

| 1 | # | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| 2 | alter Messwert | 0.9 | 1.2 | 1.4 | 1.3 | 1.3 | 1.4 | 1.5 | 1.5 | 1.4 | 1.5 | 1.5 | 1.3 | 1.1 | 0.9 | 0.5 |
| 3 | neuer Messwert | 1.2 | 1.4 | 1.3 | 1.3 | 1.4 | 1.5 | 1.5 | 1.4 | 1.5 | 1.5 | 1.3 | 1.1 | 0.9 | 0.5 | 0.1 |
| 4 | Differenz | 0.3 | 0.2 | 0.1 | 0.0 | 0.1 | 0.1 | 0.0 | 0.1 | 0.1 | 0.0 | 0.2 | 0.2 | 0.2 | 0.4 | 0.4 |
| 5 | Kriterium | 0 | 0 | X | X | X | X | X | X | X | X | 0 | 0 | 0 | 0 | 0 |
| 6 | Zeit | 1 | 1 | 1 | 2 | 3 | 4 | 5 | 6 | 7 | 8 | 1 | 1 | 1 | 1 | 1 |
| 7 | Triggersignal | 0 | 0 | 0 | 0 | 0 | 0 | 0 | 0 | 0 | 0 | 0 | 0 | 0 | 0 | 0 |
| 8 | Speicher 1 | 0 | 0 | 0 | 0 | 0 | 0 | 0 | 0 | 0 | 0 | 0 | 0 | 0 | 0 | 0 |
| 9 | Wiederholung | 0 | 0 | 0 | 0 | 0 | 0 | 0 | 0 | 0 | 0 | 0 | 0 | 0 | 0 | 0 |
| 10 | Ausgangssignal | 0 | 0 | 0 | 0 | 0 | 0 | 0 | 0 | 0 | 0 | 0 | 0 | 0 | 0 | 0 |

Fig. 3

| 1 | # | 41 | 42 | 43 | 44 | 45 | 46 | 47 | 48 | 49 | 50 | 51 | 52 | 53 | 54 | 55 |
|---|---|---|---|---|---|---|---|---|---|---|---|---|---|---|---|---|
| 2 | alter Messwert | 0.6 | 0.9 | 1.1 | 1.4 | 1.5 | 1.4 | 1.5 | 1.6 | 1.5 | 1.5 | 1.6 | 1.5 | 1.5 | 1.4 | 1.4 |
| 3 | neuer Messwert | 0.9 | 1.1 | 1.4 | 1.5 | 1.4 | 1.5 | 1.6 | 1.5 | 1.5 | 1.6 | 1.5 | 1.5 | 1.4 | 1.4 | 1.5 |
| 4 | Differenz | 0.3 | 0.2 | 0.3 | 0.1 | 0.1 | 0.1 | 0.1 | 0.1 | 0.0 | 0.1 | 0.1 | 0.0 | 0.1 | 0.1 | 0.1 |
| 5 | Kriterium | 0 | 0 | 0 | X | X | X | X | X | X | X | X | X | X | X | X |
| 6 | Zeit | 1 | 1 | 1 | 2 | 3 | 4 | 5 | 6 | 7 | 8 | 9 | 10 | 10 | 10 | 10 |
| 7 | Triggersignal | 0 | 0 | 0 | 0 | 0 | 0 | 0 | 0 | 0 | 0 | X | 0 | 0 | 0 | 0 |
| 8 | Speicher 1 | 0 | 0 | 0 | 0 | 0 | 0 | 0 | 0 | 0 | 0 | 0 | 1.5 | 1.5 | 1.5 | 1.5 |
| 9 | Wiederholung | 0 | 0 | 0 | 0 | 0 | 0 | 0 | 0 | 0 | 0 | 0 | 1 | 1 | 1 | 1 |
| 10 | Ausgangssignal | 0 | 0 | 0 | 0 | 0 | 0 | 0 | 0 | 0 | 0 | 0 | 0 | 0 | 0 | 0 |

Fig. 4

| 1 | # | 81 | 82 | 83 | 84 | 85 | 86 | 87 | 88 | 89 | 90 | 91 | 92 | 93 | 94 | 95 |
|---|---|---|---|---|---|---|---|---|---|---|---|---|---|---|---|---|
| 2 | alter Messwert | 0.5 | 0.7 | 1.1 | 1.5 | 1.6 | 1.5 | 1.5 | 1.4 | 1.4 | 1.4 | 1.5 | 1.5 | 1.6 | 1.6 | 1.5 |
| 3 | neuer Messwert | 0.7 | 1.1 | 1.4 | 1.6 | 1.5 | 1.5 | 1.4 | 1.4 | 1.5 | 1.5 | 1.5 | 1.6 | 1.6 | 1.5 | 1.5 |
| 4 | Differenz | 0.3 | 0.4 | 0.3 | 0.1 | 0.1 | 0.0 | 0.1 | 0.1 | 0.1 | 0.1 | 0.0 | 0.1 | 0.0 | 0.1 | 0.0 |
| 5 | Kriterium | 0 | 0 | 0 | X | X | X | X | X | X | X | X | X | X | X | X |
| 6 | Zeit | 1 | 1 | 1 | 2 | 3 | 4 | 5 | 6 | 7 | 8 | 9 | 10 | 10 | 10 | 10 |
| 7 | Triggersignal | 0 | 0 | 0 | 0 | 0 | 0 | 0 | 0 | 0 | 0 | X | 0 | 0 | 0 | 0 |
| 8 | Speicher 1 | 1.5 | 1.5 | 1.5 | 1.5 | 1.5 | 1.5 | 1.5 | 1.5 | 1.5 | 1.5 | 1.5 | 1.6 | 1.6 | 1.6 | 1.6 |
| 9 | Wiederholung | 1 | 1 | 1 | 1 | 1 | 1 | 1 | 1 | 1 | 1 | 1 | 2 | 2 | 2 | 2 |
| 10 | Ausgangssignal | 0 | 0 | 0 | 0 | 0 | 0 | 0 | 0 | 0 | 0 | 0 | X | X | X | X |

Fig. 5

| 1 | # | 120 | 121 | 122 | 123 | 124 | 125 | 126 | 127 | 128 | 129 | 130 | 131 | 132 | 133 | 134 | 135 | 136 | 137 |
|---|---|---|---|---|---|---|---|---|---|---|---|---|---|---|---|---|---|---|---|
| 2 | alter Messwert | 0.6 | 0.9 | 1.3 | 1.6 | 1.5 | 1.1 | 0.8 | 0.5 | 0.4 | 0.4 | 0.5 | 0.5 | 0.5 | 0.6 | 0.5 | 0.5 | 0.6 | 0.5 |
| 3 | neuer Messwert | 0.9 | 1.3 | 1.6 | 1.5 | 1.1 | 0.8 | 0.5 | 0.4 | 0.4 | 0.5 | 0.5 | 0.5 | 0.6 | 0.5 | 0.5 | 0.6 | 0.5 | 0.6 |
| 4 | Differenz | 0.3 | 0.4 | 0.2 | 0.1 | 0.4 | 0.5 | 0.3 | 0.1 | 0.0 | 0.1 | 0.0 | 0.0 | 0.1 | 0.1 | 0.0 | 0.1 | 0.1 | 0.1 |
| 5 | Kriterium | 0 | 0 | 0 | X | 0 | 0 | 0 | X | X | X | X | X | X | X | X | X | X | X |
| 6 | Zeit | 1 | 1 | 1 | 2 | 1 | 1 | 1 | 2 | 3 | 4 | 5 | 6 | 7 | 8 | 9 | 10 | 10 | 10 |
| 7 | Triggersignal | 0 | 0 | 0 | 0 | 0 | 0 | 0 | 0 | 0 | 0 | 0 | 0 | 0 | 0 | 0 | X | 0 | 0 |
| 8 | Speicher 1 | 1.6 | 1.6 | 1.6 | 1.6 | 1.6 | 1.6 | 1.6 | 1.6 | 1.6 | 1.6 | 1.6 | 1.6 | 1.6 | 1.6 | 1.6 | 0.6 | 0.6 | 0.6 |
| 9 | Wiederholung | 2 | 2 | 2 | 3 | 3 | 3 | 3 | 3 | 3 | 3 | 3 | 3 | 3 | 3 | 3 | 1 | 1 | 1 |
| 10 | Ausgangssignal | 0 | 0 | 0 | X | 0 | 0 | 0 | 0 | 0 | 0 | 0 | 0 | 0 | 0 | 0 | 0 | 0 | 0 |

SENSOR SYSTEM AND METHOD FOR DETERMINING A SWITCHING POINT FOR A SENSOR SYSTEM IN AN AUTOMATED MANNER

This application claims priority based on an International Application filed under the Patent Cooperation Treaty, PCT/EP2014/001851, filed Jul. 5, 2014, which claims priority to DE102013011668.6, filed Jul. 12, 2013

BACKGROUND OF THE INVENTION

The invention relates to a sensor system for detecting a position of a measuring object relative to a sensor, the system comprising a sensor for the provision of a measured value determined by a distance between the sensor and a measuring object and an evaluation device for the evaluation of the measured value and for the provision of an evaluation result. The invention further relates to a method for the automated setting of a switching point for the sensor system.

From DE 10 2007 029 488 A1, a method for setting the switching point of a sensor is known, the sensor being a magnetic or inductive sensor in particular, which is preferably used for determining the end positions of a piston. In the known method, a piston position is repeatedly detected by the sensor, measured values are stored and a frequency evaluation is performed for the stored measured values. After a preset number of strokes of the piston, a switching point is assigned to that piston position where the same measured values are detected in large numbers, a switching point being assigned only if there is a defined minimum number of identical measured values.

SUMMARY OF THE INVENTION

The invention is based on the problem of specifying a sensor system and a method for the automated setting of a switching point for a sensor system which offer a structure and a procedure which are simplified compared to prior art.

For a sensor system of the type referred to above, this problem is solved by the features of claim 1.

In this, it is provided that the evaluation device comprises a comparison device and a timing element, that the comparison device is configured for a comparison of a stored measured value with a currently detected measured value, that the comparison device is configured for a provision of a control signal to the timing element if a result of the comparison meets a presettable criterion, that the timing element is configured in such a way that a time measurement process is continued at the provision of the control signal and the time measurement process is started anew at an absence of the control signal, that the timing element is configured in such a way that a trigger signal is output by the timing element on reaching a presettable period of time, and that the evaluation device comprises a memory device arranged for storing the current measured value on arrival of the trigger signal.

The evaluation device is provided for facilitating an independent setting of at least one switching point by the sensor system with a minimum of data processing. It is intended that the sensor system outputs, at the at least one switching point, a sensor signal in the form of a concrete position value and/or a switching signal, in particular a digital switching signal, which is used for delivering to a higher-order control unit, for example a programmable logic controller (PLC), coupled to the sensor system the information that the measuring object has reached a previously detected and stored operating position. The operating position of the measuring object which is linked to a switching point typically is an end position adopted by a rotary or translational actuator along a path of motion. In addition or as an alternative, the position of the measuring object may be an intermediate position between two end positions. An operating position is determined by the fact that the measuring object preferably remains at the respective point for a certain period of time.

In deviation from the method for setting the switching point of a sensor using a frequency evaluation as known from prior art, the sensor system according to the invention only involves a time-limited comparison of a currently detected measured value to a preferably single stored measured value. The period of time provided for this purpose is stored in the timing element, which continues a time measuring process until either the preset period of time has elapsed or the control signal from the comparison device fails to appear. At a non-appearance of the control signal, the timing element is reset, so that the time measuring process starts anew. The control signal is provided by the comparison device if a stored measured value matches a currently detected measured value. In this context, it is provided that, following the completion of a comparison between the stored measured value and the currently detected measured value, the stored measured value is replaced by the current measured value in preparation for the next comparison cycle. The previously stored measured value is rejected, so that it requires neither a memory location nor the administration of a memory location. The criterion used for assessing the result of the comparison may, for example, be a maximum permissible difference between the stored and the current measured value. For a decision whether the control signal should continue to be provided to the timing element or whether the timing element should be reset as a result of the non-appearance of the control signal, the only things required are a memory cell for a previous value of the measured value, a first comparison operation for processing the two measured values and a second comparison operation for matching the result of the first comparison operation to a presettable criterion. At least at regular intervals, there is an enquiry in the timing element as to whether the control signal is provided by the comparison device. If this is the case, a time measurement is continued in the timing element until a presettable period of time has elapsed. When the presettable period of time has elapsed, the timing element outputs a trigger signal which results in the storage of the current measured value within the evaluation device. This measured value now serves as a switching point for the sensor system, so that, when this measured value is once again detected, a position signal can be output to a higher-order control unit, for example a programmable logic controller, in order to indicate that the measuring object has reached a preset, in particular a mechanically preset, operating position.

In practical terms, a switching point can be defined by the sensor system whenever the speed of the measuring objects diminishes or is zero and the measured values established by the sensor system are substantially constant at least over a preset period of time.

The measured value is preferably an electric voltage or current signal which is in turn determined by a measurement result of a sensor or by measurement results of several sensors. By way of example, it may be provided that the sensor system comprises a biaxial Hall sensor which is capable of detecting a radial field component and an axial field component of a magnetic field, in particular that of a permanent magnet, of the measuring object and which reckons up the two magnetic field components in a presettable manner, so that the desired measured value can be output.

Advantageous further developments of the invention are specified in the dependent claims.

It is expedient if the comparison device is configured for the storage of precisely one measured value, in particular one which has been detected last. In this way, the comparison device can have a very simple structure, because it requires only one memory cell for the measured value as there is no need for the complex administration of a plurality of memory cells. The measured values are preferably detected at a constant clock rate, so that they can be determined and processed sequentially. The comparison device preferably compares the respective current measured value to a measured value which has arrived immediately before, i.e. to the value received last.

It is advantageous if the memory device is configured for the storage of a plurality of measured values of different operating positions. In this way, a plurality of switching points can be set by the sensor system for a plurality of operating positions along a path of motion of the measuring object, e.g. an axis of motion in the case of a linear drive or a circular path in the case of a rotary actuator.

In a further development of the invention, it is provided that the evaluation device is configured for outputting a position signal if a currently detected measured value coincides at least almost with a measured value stored in the memory device. The position signal can be output when the measuring object passes the respective operating position and/or when the measuring object remains in the respective operating position for a presettable minimum duration. The position signal preferably includes information on the position reached by the measuring object, or the measured value present at the respective operating position is output as a position signal. In this way, different position signals can be output by simple means. By way of example, it may be provided that the sensor system does not output a signal as long as the current measured value matches none of the stored measured values. As soon as the current measured value coincides at least almost with the stored measured value, the respective current measured value can be output once, repeatedly or continuously. For deciding whether the current measured value coincides at least almost with the stored measured value, a comparison criterion can be applied. This may, for example, be defined as the maximum permissible difference between the two measured values.

In a further variant of the invention, the evaluation device is configured such that the position signal is output only if a measured value stored in the memory device has been acknowledged at least once by the presence of a trigger signal at an at least almost identical measured value. As a result, a defined position along the path of motion of the measuring object is approached at least for a second time in such a way that the timing element outputs a trigger signal before the position signal is output. In this way, a storage of a measured value is avoided at a position of the measuring object along the path of motion which has been approached by the measuring object only once, for example owing to external circumstances, such as a temporary unplanned blocking of the movement of the measuring object. To compare the two measured values, a comparison criterion, in particular of the type referred to above, can be provided.

According to a second aspect, the problem of the invention is solved by a method for the automated setting of a switching point for a sensor system which outputs a measured value as a function of a distance between a sensor and a measuring object, the method comprising the recurring steps of: detecting a first measured value at a first point in time and storing the first measured value in a comparison device, detecting a second measured value at a second point in time and comparing the second measured value to the first measured value, providing a control signal to a timing element only if a result of the comparison of the two measured values meets a presettable criterion, continuation of a time measuring process by the timing element on provision of the control signal, renewed start of the time measuring process by the timing element at the non-appearance of the control signal, outputting a trigger signal from the timing element to the memory device on reaching a presettable period of time, storing the current measured value in a memory device of the evaluation device on the arrival of the trigger signal.

In a variant of the method, it is provided that, for comparing the first measured value to the second measured value, the first measured value is stored temporarily, in particular exclusively stored temporarily.

In a further variant of the method, it is provided that the evaluation device outputs a position signal if a currently detected measured value coincides at least almost with a measured value stored in the memory device.

In a further variant of the method, it is provided that a position signal is output only after a measured value stored in the memory device has been acknowledged by the presence of a trigger signal at an identical measured value.

In a further variant of the method, it is provided that a detection range in which the presettable criterion can be met is preset for the measured value, wherein a switching point is redefined only within the detection range. The detection range is that section of the path of motion in which the sensor system can detect a reliable measurement signal. A definition of an operating position and an output of a position signal should be possible only within this range.

BRIEF DESCRIPTION OF THE DRAWINGS

An advantageous embodiment of the invention is illustrated in the drawing, of which:

FIG. 3 is a first value table for a method for the automated setting of a switching point for a sensor system, FIG. 4 is a second value table for the method for the automated setting of a switching point, FIG. 5 is a third value table for the method for the automated setting of a switching point.

DETAILED DESCRIPTION OF THE PREFERRED EMBODIMENTS

Figure 1:
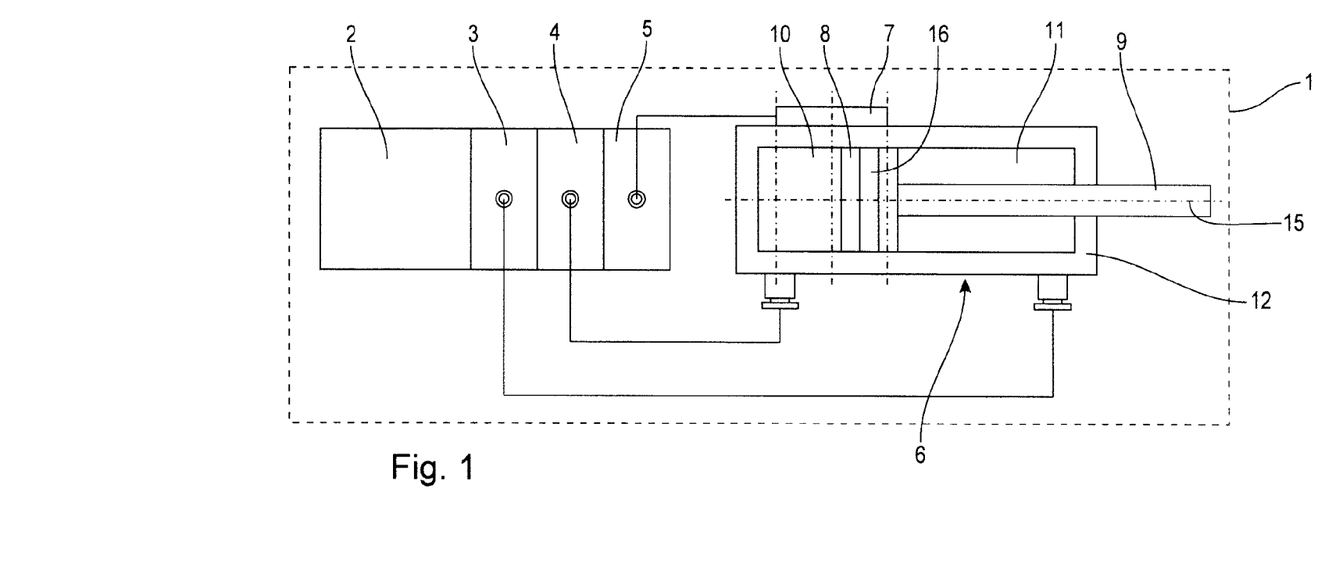
FIG. 1 is a diagrammatic representation of an automation system with a sensor system according to the invention.

FIG. 1 shows an automation system 1, which in the illustrated embodiment comprises a control unit 2, two valve units 3, 4 connected to the control unit 2, an input unit 5 and an actuator 6 represented by a pneumatic cylinder by way of example. On the actuator 6, a sensor system 7 designed for detecting a position of a measuring object, in the present case a piston 8, relative to the sensor system 7 is provided.

The automation system 1 can, for example, be used for temporarily clamping a workpiece not shown in the drawing. For this purpose, the piston 8 with the piston rod 9 mounted thereon can be moved between different operating positions along a path of motion represented by an axis of motion 15 in the illustrated embodiment by the controlled application of fluid pressure to at least one operating chamber 10, 11 of a cylinder housing 12 of the actuator 6. For distinguishing between a clamped state of the workpiece and a released state of the workpiece, the sensor system 7 is provided for determining the relative position of the piston 8. In the illustrated embodiment, the piston 8 is provided with an annular magnet 16, which provides a magnetic field with axial and radial magnetic field components, which is not shown in the drawing. The sensor system 7 is designed to detect at least one of these magnetic field components and is intended to output a position signal to the input unit 5 whenever the piston 8 accurately reaches one or at least one operating position along the axis of motion 15. The sensor system 7 is designed such that it can itself detect the operating positions along the axis of motion 15 and outputs a position signal only if the piston 8 reaches the respective operating position. An operating position should in this context be characterised by the fact that the piston 8 rests for a specific presettable period of time at a position along the axis of motion 15, for example in a clamping position for holding the workpiece.

Figure 2:
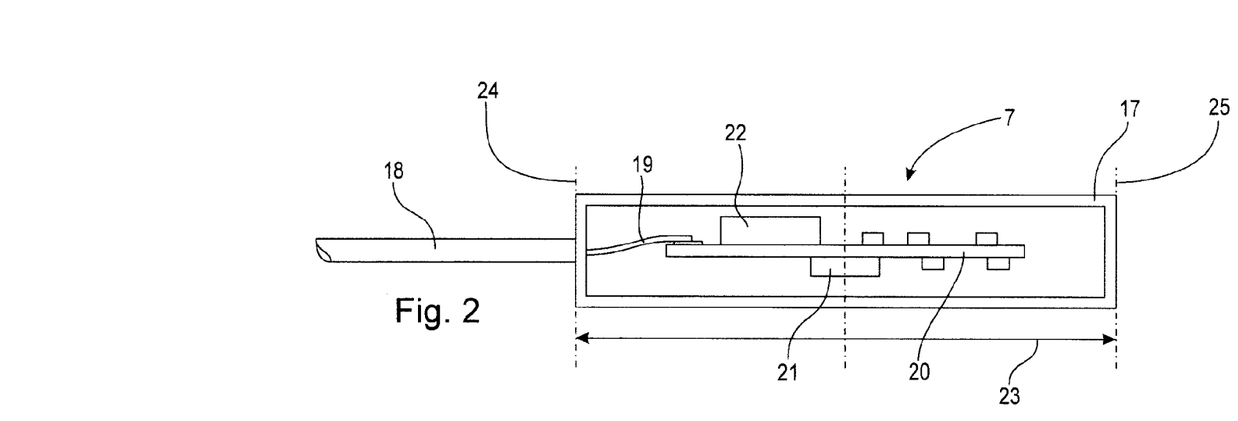
FIG. 2 is a diagrammatic representation of the sensor system according to the invention.

According to the exemplary embodiment shown in FIG. 2, the sensor system 7 comprises a closed sensor housing 17, for example made up of two half-shells joined to each other by adhesive force. In the illustrated embodiment, a connecting cable 18, the sheath of which (not identified in detail) is joined to the sensor housing 17 by adhesive force and the connecting strands 19 of which project into the sensor housing 17 and establish an electric connection to the input unit 5, passes through an end region of the sensor housing 17. The sensor housing 17 accommodates a circuit board 20 designed as a multi-layer printed circuit, on which is mounted a plurality of electric and electronic components forming an electronic circuit.

In the illustrated embodiment, the essential electronic components of this circuit are a magnetic field sensor 21 and a microcontroller 22, which are electrically connected to each other by means of the circuit board 20. By way of example, the magnetic field sensor is represented by a Hall sensor or MR (magnetoresistive) sensor, in particular as a biaxial Hall sensor. The magnetic field sensor 21 delivers a magnetic field signal to the microcontroller 22 as a function of at least one magnetic field component of the annular magnet 16. The magnetic field sensor 21 preferably provides two magnetic field signals which represent the radial and the axial magnetic field component of the annular magnet 16. The microcontroller 22 can be configured and/or programmed such that it pre-processes the two magnetic field signals into a single measured value and uses this measured value for further processing as described in greater detail below. Alternatively, this signal processing action can be performed by the magnetic field sensor 21.

According to the invention, the sensor system is intended for the automatic determination of at least one operating position and, on completion of this determination, for outputting a position signal to the input unit 5 whenever the piston 8 serving as a measuring object reaches the at least one specified operating position.

The advantages of an automatic determination of the at least one operating position by the sensor system 7 lie in the fact that the sensor system 7 can be mounted on the actuator 6 before the final installation of the actuator 6 into the automation system 1, as well as in the fact that the at least one operating position can be tracked if this operating position is changed mechanically in the course of time, for example by setting operations in the actuator 6 and/or in other components (not illustrated) of the automation system 1, which interact mechanically with the actuator 6.

Although sensor systems which are not designed for an automatic determination of the at least one switching position can be mounted on the actuator before the final installation of the actuator, they either have to be adjusted after the installation of the actuator into the automation system by mechanical relocation followed by fixing in position, or they have to be programmed using a separate programming device or a programming function of a higher-order control system, for example a programmable logic controller. This results in additional complexity in the setup of the automation system, which can be avoided with the aid of the sensor system according to the invention. The sensor system according to the invention furthermore offers the opportunity of tracking the at least one operating position during the operation of the automation system, i.e. of correcting it automatically. By way of example, it may be provided that this automatic tracking is blocked by a blocking signal transmitted to the sensor system, or the sensor system can be configured such that the at least one operating position is tracked only if an enable signal is applied to the sensor system.

A determination of an operating position is described below by way of example with reference to the sensor system 7 shown in FIGS. 1 and 2 and to the value tables of FIGS. 3 to 5. In the case of the sensor system 7 shown in FIGS. 1 and 2, it is assumed that the magnetic field sensor 21 is in the middle of the sensor housing 17 and that the magnetic field sensor 21 has a symmetric detection range 23 extending along the axis of motion 15. The limits 24, 25 of the detection range 23 are indicated by the broken lines and coincide with the dimensions of the sensor housing 17 in the illustrated embodiment. The detection range 23 is that range along the axis of motion 15 in which the magnetic field sensor 21 can reliably measure the relevant magnetic field components and therefore provide at least one clear and reproducible sensor signal. For use on the actuator 6, the sensor system 7 is initially mounted on the actuator 6 in that position in which the at least one operating position yet to be determined is likely to lie. In the present case, the clamping position of the actuator 6, in which the partially extended piston rod 9 can locate a workpiece not shown in the drawing, is to be determined with the aid of the sensor system 7. The positions of the piston 8 and the piston rod 9 in the clamping position are shown in FIG. 1.

When this operating position is reached, a clearly definable magnetic field of the annular magnet 16 is generated at the sensor system 7. For a clear determination of the operating position of the piston 8, both the radial and the axial magnetic field component of the annular magnet 16 are preferably determined.

FIGS. 3 to 5 shows value tables for the following values which are relevant to the determination of the operating position in the sensor system 7. In the illustrated embodiment, it is assumed that in each case only the old measured value and the new measured value in at least one operating position are stored.

In the first line of the value table, which is identified by "#", a numeric value is specified which is intended for an overall view only and which in the illustrated embodiment corresponds to a cycle of the sensor system 7 but is not raised or stored in the sensor system 7. There is no correlation between the numeric values in line 1 and those entered in the further lines. The measuring cycles according to the value tables of FIGS. 3 to 5 are intended to start at different points in time, which is symbolised by jumps in the numbering of the cycles between the individual value tables. The explanations below are based on the assumption that in work cycles 1 to 95 given by way of example the piston is repeatedly moved into the operating position and out of the operating position, which explains the changes in the measured values.

In the second line of the value table, which is identified as "Old measured value", a stored measured value is given, which in each case refers to a measurement in the previous work cycle and which is replaced by the current measured value after a processing step.

In the third line of the value table, which is identified as "New measured value", the value for the respective current measured value is given.

In the fourth line of the value table, which is identified as "Difference", the result of a comparison operation is given, which is determined in a comparison device of the evaluation device formed in the microcontroller 22 for the measured values. In the illustrated embodiment, the comparison operation is represented by a differentiation between the stored "Old measured value" and the current "New measured value", the result given in the value table being the amount of the difference between the two values.

In the fifth line of the value table, which is identified as "Criterion", it is indicated whether the value from the calculation operation meets a presettable criterion or whether this is not the case. If the value from the calculation operation corresponds to the presettable criterion—in the illustrated embodiment a difference of less than/equal to 0.1—the comparison device outputs a control signal to a timing element provided in the electronic circuit of the sensor system 7. The output of the control signal is identified by "X" in the fifth line of the value table.

In the sixth line of the value table, which is identified as "Time", a continuous duration which can adopt values of 1 to a maximum of 10 is given. If the comparison device does not provide a control signal to the timing element, the duration remains at the starting value 1 or is reset to this starting value. If a control signal is provided to the timing element within the respective work cycle, a time measuring process is continued, so that the values for the duration are incremented by 1 in each work cycle in which the control signal is applied.

In the seventh line of the value table, which is identified as "Trigger signal", an "X" is entered if the timing element outputs a trigger signal to the evaluation device. This is the case if the timing element has carried out the time measuring process without interruption over the presettable period of time, which is 10 work cycles in the case of the illustrated embodiment. In FIG. 3, this is not the case, because in the period of time specified there—from the first to the fifteenth work cycle—the timing element has in each case been reset before the preset period of time has been reached.

In the value table of FIG. 4, which contains measured values assigned to work cycles 41 to 55 by way of example, the point in time at which the control signal has been provided to the timing element 10 times in an uninterrupted sequence is reached in work cycle 52, so that the timing element provides a trigger signal to the evaluation device in this work cycle. As a result of this trigger signal, the current measured value is stored in a memory cell of the microcontroller 22, which is not shown in the drawing and which is checked by the evaluation device. The measured value stored after passing through the first successful measuring cycle is specified in line 8 identified as "Memory 1".

In the illustrated embodiment, the sensor system 7 is designed such that no position signal is transmitted to the input unit 5 at a first storage of a measured value in the memory of the microcontroller 22. On the contrary, it is provided that a position signal is output only after the operating position determined by the sensor system 7 has been confirmed in a further measuring cycle.

This further measuring cycle is shown in FIG. 5 by way of example and is assigned to work cycles 81 to 95. Here, too, a trigger signal is output by the timing element to the evaluation device after the control signal has been applied to the timing element 10 times without interruption, the evaluation device comparing the measured value stored in the first memory and relating to the preceding measuring cycle according to work cycles 43 to 52 to the current measured value stored in the repeat memory. If the comparison of the two measured values indicates that they meet a presettable criterion, for example deviating by no more than 0.1 according to the numeric values given here purely by way of example, the evaluation device can output a position signal, which is represented in the tenth line by the "X" in work cycle 93. The position signal can be a logic switching signal with a high level "1" and/or a numeric value of the value measured at the detected operating position.

Figure 7:
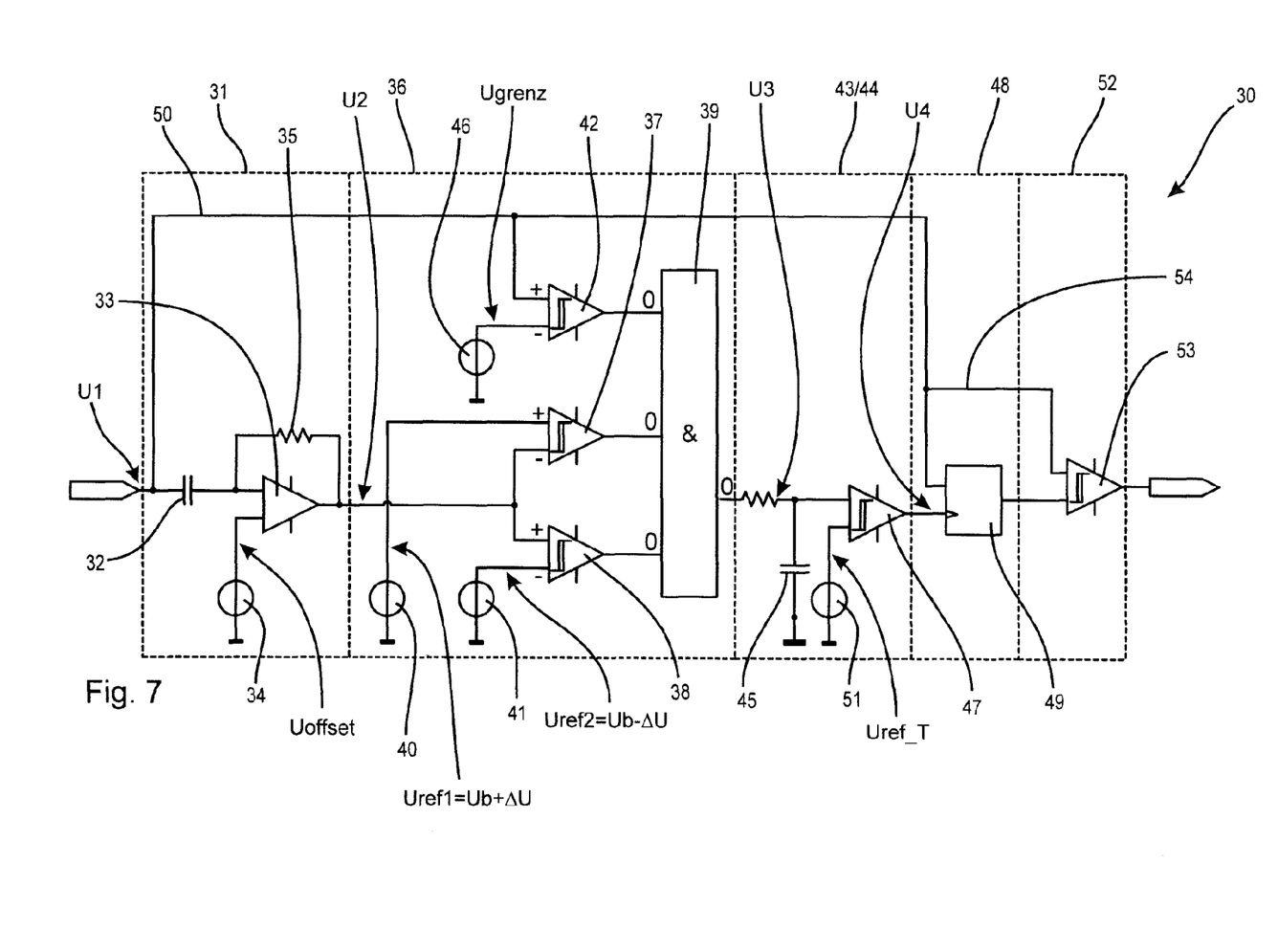
FIG. 7 is a schematic circuit diagram of an analogue circuit for the evaluation and processing of measured values.

In an alternative embodiment of the sensor system, in particular in the analogue evaluation device described in FIG. 7, the position signal is already transmitted to the input unit on the first occurrence of the trigger signal.

Figure 6:
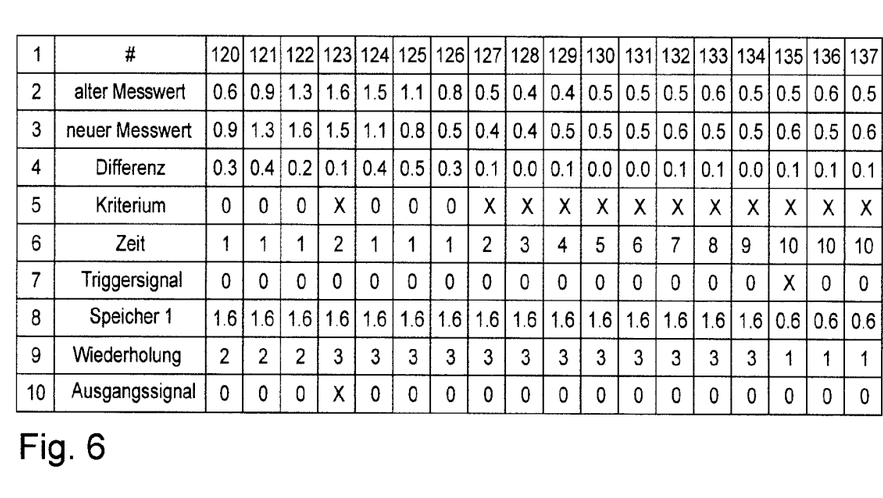
FIG. 6 is a fourth value table for the method for the automated setting of a switching point.

A further measuring cycle is shown by way of example in the value table of FIG. 6; this is assigned to work cycles 120 to 137. As the repeat memory in line 9 of the table of FIG. 5 already stands on the value 2, a signal can be output on the occurrence of a new measured value approximating the stored measured value within an interval not shown in the drawing, which is the case in columns 122 and 123.

As the new measured value then changes once again, the output of the signal is then terminated from column 124.

From column 127, the preset maximum difference of 0.1 between the old and the new measured value is fallen below at a level deviating from the measured value stored up to now in memory 1, so that the criterion is found to be met from column 127, and the time begins to run. As the criterion is met in 10 successive sections of time, the trigger signal is provided in column 134 as indicated in line 7. As a result, the new measured value is stored in memory 1, and the repeat memory is reset to the value of 1 as indicated in line 9 of the table of FIG. 6, because the newly stored measured value has yet to be confirmed before the newly stored measured value and/or a corresponding switching signal can be output, which may be the case in a subsequent measuring cycle not shown in the drawing.

In a further development of the embodiments described above, it is provided that a new operating position can only be stored if an enable signal is applied to the sensor system or a blocking signal is temporarily interrupted. In this way, there is no risk that one or more operating positions could be learned inadvertently, for example if there is a fault or if the measuring object is moved to a new position along the axis of motion during maintenance or repair work.

In addition or alternatively, it may be provided that the sensor system outputs a message if the use of the procedure described above results in a shifting of an already determined operating position within a presettable range around the stored measured value of the previous operating position. For this purpose, it may be provided that, before a new operating position is stored, the evaluation device performs an adjustment with the stored measured values of the already determined operating positions, and that information is output to a user if the new operating position lies within the preset range around the present operating position. This can, for example, be the case as a result of mechanical changes in the automation system, which can in this case be checked by the user. If applicable, it may be provided that the new operating point is stored after being released by a user for further use, or that the new operating point is rejected on completion of maintenance or repair work. Alternatively, it may be provided that the new operating position is used and the old operating position is stored, for example for drawing conclusions regarding the load placed on the automation system from the number of changed operating positions.

In the analogue evaluation circuit 30 shown in FIG. 7, an analogue processing of the measured value(s) is provided. This is particularly advantageous if the evaluation circuit is intended to be an individually designed semiconductor circuit on a semiconductor substrate (application-specific integrated circuit—ASIC), because such an analogue evaluation circuit requires less space than a corresponding digital evaluation circuit.

In the exemplary embodiment shown in FIG. 7, the analogue evaluation circuit 30 is divided into a plurality of blocks in order to represent and describe the individual functions more easily. In an analogue evaluation circuit not shown in the drawing, the components of the evaluation circuit 30 described in greater detail below can be arranged in a different, in particular more compact, way.

To a first block 31 of the analogue evaluation circuit 30, an input voltage U1, which corresponds to the detected measured value and which can, for example, be provided by the magnetic field sensor 21 shown in FIG. 1, is applied.

The first block 31 includes a differentiating element which derives the input voltage U1 in accordance with time. In this way, the input voltage U1, which, for example, represents a position of an annular magnet 16 along an axis of motion, becomes an electric output voltage U2, which is proportional to the speed of the annular magnet 16. For differentiation, the input voltage U1 is first applied to a first terminal of a capacitor 32, the second terminal of which is connected to a first input of an operational amplifier 33. A reference voltage Uoffset provided by a first reference voltage source 34 is applied to a second input of the operational amplifier. Furthermore, a resistor 35 designed for level matching of the output voltage U2 and for an adjustment of the behaviour of the differentiating element in time is connected between the first input of the operational amplifier 33 and its output terminal.

The output voltage U2 of the operational amplifier 33 is provided to a second block 36, which comprises three comparators 37, 38, 42 and a logic circuit 39. In the illustrated embodiment, the two comparators 37, 38 are designed as operational amplifiers to which the output voltage U2 of the operational amplifier 33 is applied at a first input. To a second input of the comparator 37, a second reference voltage source 40 with a reference voltage Uref2, which is higher than a base voltage Ub by the amount of ΔU, is connected. To a second input of the comparator 38, a third reference voltage source 40 with a reference voltage Uref3, which is lower than a base voltage Ub by the amount of ΔU, is connected. An output signal is only provided to an output terminal of the comparator 37 if the output voltage U2 fed into the comparator 37 is lower than the reference voltage Uref2. An output signal is only provided to an output terminal of the comparator 38 if the output voltage U2 fed into the comparator 38 is higher than the reference voltage Uref3.

Accordingly, the reference voltages Uref2 and Uref3 determine the limits of a voltage interval within which output signals are output by both comparators 37 and 38 at logic level 1, provided that the output voltage U2 fed in lies within this voltage interval.

This is the case if the input voltage U1 has not changed in the observed time interval, the annular magnet 16 having zero speed relative to the magnetic field sensor 21 in the illustrated embodiment.

In order to ensure that the input voltage U1 has a presettable minimum level and is therefore based on a plausible measurement result, the third comparator 42 is provided. A first input of this comparator 42 is coupled to the input voltage U1 via a measuring line 50. A second input of the comparator 42 is connected to a fourth reference voltage source 46, which provides a reference voltage Ugrenz, which has to be exceeded by the input voltage U1 if the comparator 42 is to output an output signal to the logic circuit 39.

Accordingly, the logic circuit 39 designed as an AND element only outputs a voltage level different from zero as logic voltage U3 if the three comparators 37, 38, 42 output signals at a logic level 1.

In a third block 43, a timing element 44 represented by a capacitor 45 in the illustrated embodiment is provided. The capacitor 45 is charged by the logic voltage U3. As soon as the capacitor 45 is charged enough for a capacitor charging voltage U4 to exceed a reference voltage value Uref_T predetermined by a fifth reference voltage source 51, the comparator 47, which compares the capacitor charging voltage U4 to the reference voltage Uref_T, transmits a trigger signal to the fourth block 48.

In the fourth block 48, an analogue memory 49 is located, which stores the voltage level applied to a measuring line 50 on the arrival of a trigger signal. As the measuring line 50 is directly coupled to the input voltage U1, the input voltage U1 is stored accordingly. The analogue memory 49 is designed to output the stored voltage level as memory voltage U5 to the fifth block 52, which contains a further comparator 53. The comparator 53 is connected with a first input to the measuring line 50 via a reference line 54. With a second input, the comparator 53 is connected to the analogue memory 49. The comparator 53 outputs an output signal if the memory voltage U5 and the input voltage U1 both lie within a presettable interval. This output signal can then, for example, be made available to a control unit not shown in the drawing in order to document that the annular magnet 16 adopts, relative to the magnetic field sensor 21, a position determined by the storage process referred to above.

It is preferably provided that the capacitor 45 is actively discharged as soon as the logic signal U3 approaches or becomes zero.

| | Table Headings |
|---|---|
| 2 | Old measured value |
| 3 | New measured value |
| 4 | Difference |
| 5 | Criterion |
| 6 | Time |
| 7 | Trigger signal |

| Table Headings | |
|---|---|
| 8 | Memory 1 |
| 9 | Repetition |
| 10 | Output signal |

The invention claimed is:

1. A sensor system for detecting a position of a measuring object relative to a sensor, the sensor system comprising the sensor for a provision of a measured value determined by a distance between the sensor and the measuring object, and an evaluation device for an evaluation of the measured value and for a provision of an evaluation result, wherein the evaluation device comprises a comparison device and a timing element, wherein the comparison device is configured for a comparison of a stored measured value with a currently detected measured value, wherein the comparison device is configured for a provision of a control signal to the timing element if a result of the comparison meets a presettable criterion, wherein the timing element is configured in such a way that a time measurement process is continued at the provision of the control signal and the time measurement process is started anew at an absence of the control signal, wherein the timing element is configured in such a way that a trigger signal is output by the timing element on reaching a presettable period of time, and wherein the evaluation device comprises a memory device arranged for storing the currently detected measured value on arrival of the trigger signal.

2. The sensor system according to claim 1, wherein the comparison device is configured for the storage of precisely one measured value.

3. The sensor system according to claim 1, wherein the memory device is configured for the storage of a plurality of measured values of different operating positions.

4. The sensor system according to claim 1, wherein the evaluation device is configured for outputting a position signal if a currently detected measured value coincides at least almost with the stored measured value stored in the memory device.

5. The sensor system according to claim 4, wherein the evaluation device is configured such that the position signal is output only if the stored measured value stored in the memory device has been acknowledged at least once by the presence of a trigger signal at an at least almost identical measured value.

6. A method for the automated setting of a switching point for a sensor system which outputs a measured value as a function of a distance between the sensor and a measuring object, the method comprising the recurring steps of:
  detecting a first measured value at a first point in time and storing the first measured value in a comparison device,
  detecting a second measured value at a second point in time and comparing the second measured value to the first measured value,
  providing a control signal to a timing element only if a result of the comparison of the first and second measured values meets a presettable criterion,
  continuing a time measuring process by the timing element on a provision of the control signal,
  restarting the time measuring process by the timing element at the non-appearance of the control signal,
  outputting a trigger signal from the timing element to a memory device of an evaluation device on reaching a presettable period of time; and
  storing a currently measured value in the memory device of the evaluation device on the arrival of the trigger signal.

7. The method according to claim 6, wherein the first measured value is temporarily stored for comparing the first measured value to the second measured value.

8. The method according to claim 6, wherein the evaluation device outputs a position signal if a currently detected measured value coincides at least almost with a measured value stored in the memory device.

9. The method according to claim 8, wherein the position signal is output only after a measured value stored in the memory device has been acknowledged by the presence of the trigger signal at an identical measured value.

10. The method according to claim 7, wherein a detection range in which the presettable criterion can be met is preset for the measured value, wherein a switching point is redefined only within the detection range.

11. The sensor system according to claim 2, wherein the comparison device is configured for the storage of the measured value which has been detected last.

* * * * *